United States Patent
Lu et al.

(10) Patent No.: US 11,921,370 B2
(45) Date of Patent: Mar. 5, 2024

(54) DISPLAY PANEL AND PREPARATION METHOD THEREOF

(71) Applicant: TCL CHINA STAR OPTOELECTRONICS TECHNOLOGY CO., LTD., Guangdong (CN)

(72) Inventors: Ying Lu, Guangdong (CN); Yingchun Zhao, Guangdong (CN); Wuguang Liu, Guangdong (CN); Lixia Li, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/814,524

(22) Filed: Jul. 24, 2022

(65) Prior Publication Data
US 2023/0408862 A1   Dec. 21, 2023

(30) Foreign Application Priority Data
Jun. 17, 2022   (CN) .......................... 202210692694.4

(51) Int. Cl.
*G02F 1/1335* (2006.01)
*G02F 1/1339* (2006.01)

(52) U.S. Cl.
CPC .. *G02F 1/133553* (2013.01); *G02F 1/133516* (2013.01); *G02F 1/1339* (2013.01)

(58) Field of Classification Search
CPC ................................................ G02F 1/133553
See application file for complete search history.

(56) References Cited

U.S. PATENT DOCUMENTS

| | | | |
|---|---|---|---|
| 2011/0267564 A1* | 11/2011 | Kim | G02F 1/1395 349/86 |
| 2022/0308409 A1* | 9/2022 | Zhong | H01L 27/1248 |

FOREIGN PATENT DOCUMENTS

| | | |
|---|---|---|
| CN | 1281156 A | 1/2001 |
| CN | 1410810 A | 4/2003 |
| CN | 1438529 A | 8/2003 |
| CN | 102087435 A | 6/2011 |
| CN | 106898615 A | 6/2017 |
| CN | 210605272 U | 5/2020 |
| TW | I293703 B | 2/2008 |

OTHER PUBLICATIONS

Chinese Office Action issued in corresponding Chinese Patent Application No. 202210692694.4 dated Apr. 4, 2023, pp. 1-10.

* cited by examiner

*Primary Examiner* — Edmond C Lau
(74) *Attorney, Agent, or Firm* — PV IP PC; Wei Te Chung; Zhigang Ma (57) ABSTRACT

Disclosed are a display panel and a method of manufacturing a display panel. The display panel includes an array substrate; a color film substrate disposed opposite to the array substrate; a liquid crystal layer disposed between the array substrate and the color film substrate; a reflective layer disposed on a side of the array substrate facing the liquid crystal layer. The reflective layer comprises a plurality of first convex structures, each of the first convex structures has a first sidewall extending from a bottom to a top of each of the first convex structures, and an angle between a normal line of the first sidewall and a horizontal plane is greater than 0° and less than or equal to 10°.

4 Claims, 8 Drawing Sheets

DISPLAY PANEL AND PREPARATION METHOD THEREOF

TECHNICAL FIELD

The present disclosure belongs to the field of display technology, and in particular, to a display panel and a method of manufacturing the display panel.

BACKGROUND

Liquid crystal displays (LCDs) may be divided into a transmissive liquid crystal display, a semi-transmissive semi-reflective liquid crystal display, and a reflective liquid crystal display, according to different of light sources. With the increasing demand for low power consumption in outdoor display market, the market prospects for semi-transmissive semi-reflective liquid crystal displays and reflective liquid crystal displays are gradually emerging. Compared with the transmissive liquid crystal display, both of the semi-transmissive semi-reflective liquid crystal display and the reflective liquid crystal display can clearly display images under ambient light as a light source, and the reflective liquid crystal display needs no backlight source, and can further exhibit the advantages of a thin and light body and low power consumption.

However, existing semi-transmissive semi-reflective liquid crystal displays and reflective liquid crystal displays have low reflectivity to ambient light.

SUMMARY

Embodiments of the present disclosure provide a display panel and a method of manufacturing a display panel, to improve the reflectivity of a semi-transmissive semi-reflective liquid crystal display and a reflective liquid crystal device to ambient light.

According to a first aspect, an embodiment of the present disclosure provides a display panel, comprising:
   an array substrate;
   a color film substrate disposed opposite to the array substrate;
   a liquid crystal layer disposed between the array substrate and the color film substrate;
   a reflective layer disposed on a side of the array substrate facing the liquid crystal layer, wherein the reflective layer comprises a plurality of first convex structures, each of the first convex structures has a first sidewall extending from a bottom to a top of each of the first convex structures, and an angle between a normal line of the first sidewall and a horizontal plane is greater than 0° and less than or equal to 10°.

Optionally, the display panel further comprises:
an organic layer disposed between the array substrate and the reflective layer, wherein the organic layer comprises a plurality of second convex structures, and the reflective layer covers the organic layer in a uniform thickness to form one of the first convex structures on each of the second convex structures.

Optionally, the reflective layer further comprises:
a plurality of convex rings, wherein at least one of the convex rings is disposed on a peripheral edge of each of the first convex structures. Optionally, each of the convex rings comprises a second sidewall, and an angle between a normal line of the second sidewall and a horizontal plane is greater than 0° and less than or equal to 10°.

Optionally, an orthographic projection of each of the first convex structures on the array substrate is circular, and an orthographic projection of each of the convex rings on the array substrate is annular.

Optionally, the display panel comprises a first transparent protective layer and a second transparent protective layer, and the first transparent protective layer is disposed on the organic layer, the reflective layer is disposed on the first transparent protective layer, and the second transparent protective layer is disposed on the reflective layer.

According to a second aspect, an embodiment of the present disclosure further provides a method of manufacturing a display panel, comprising:
   fabricating a reflective layer on an array substrate, wherein the reflective layer comprises a plurality of first convex structures, each of the first convex structures has a first sidewall extending from a bottom to a top of each of the first convex structures, and an angle between a normal line of the first sidewall and a horizontal plane is greater than 0° and less than or equal to 10°;
   providing a liquid crystal layer on a side of the reflective layer far away from the array substrate;
   providing a color film substrate on a side of the liquid crystal layer far away from the array substrate, to form the display panel.

Optionally, the step of fabricating the reflective layer on the array substrate, wherein the reflective layer comprises the plurality of first convex structures, each of the first convex structures has the first sidewall extending from the bottom to the top of each of the first convex structures, and the angle between the normal line of the first sidewall and the horizontal plane is greater than 0° and less than or equal to 10°, comprises:
   providing a material of an organic layer on the array substrate;
   providing a photomask, and exposing, developing and etching the material of the organic layer with the photomask, to form the organic layer having a plurality of second convex structures; and
   providing the reflective layer on a side of the organic layer where the second convex structures are disposed, so that one of the first convex structures is formed in the reflective layer corresponding to each of the second convex structures.

Optionally, the method of fabricating the photomask comprises:
   providing a light-shielding material;
   engraving a plurality of circular first light-shielding portions on the light-shielding material;
   hollowing out a peripheral edge of each of the first light-shielding portions to form a plurality of developing units having light transmission regions, wherein the plurality of developing units constitute the photomask.

Optionally, the method of fabricating the photomask further comprises:
   providing a light-shielding material;
   engraving a plurality of circular first light-shielding portions on the light-shielding material;
   engraving at least one annular second light-shielding portion surrounding each of the first light-shielding portions;
   hollowing out a region between each of the first light-shielding portions and the corresponding at least one second light-shielding portion and a region between two adjacent second light-shielding portions, to form a plurality of developing units having light transmission regions, wherein the plurality of developing units constitute the photomask.

According to the display panel and the method of manufacturing the display panel in the embodiments of the present disclosure, a plurality of first convex structures are formed in the reflective layer, and the first sidewalls of the first convex structures are used to reflect ambient light to the display surface of the display panel. The first convex structures may be provided to increase the diffuse reflection of ambient light, and reduce the influence of total reflection on the reflectivity of the reflective layer, thereby improving the reflectivity of the display panel to ambient light.

BRIEF DESCRIPTION OF THE DRAWINGS

In order to more clearly explain the technical solutions in the embodiments of the present disclosure, the following will briefly introduce the drawings required in the description of the embodiments. It will be apparent that the drawings in the following description are only some embodiments of the present disclosure. For those skilled in the art, other drawings can be obtained based on these drawings without paying any creative effort.

For a more complete understanding of the present disclosure and advantages thereof, reference will now be made to the accompanying drawings. In the following description, like reference numerals refer to like parts.

DETAILED DESCRIPTION OF EMBODIMENTS

Technical solutions in the embodiments of the present disclosure will be clearly and completely described with reference to the accompanying drawings in the embodiments of the present disclosure. It will be apparent that the described embodiments are only part of the examples of the present disclosure, and not all examples. Based on the embodiments in the present disclosure, all other embodiments obtained by a person skilled in the art without involving any creative effort are within the scope of the present disclosure.

In order to solve the problem of low reflectivity of the existing semi-transmissive semi-reflective liquid crystal displays and reflective liquid crystal displays to ambient light, embodiments of the present disclosure provide a display panel and a method for preparing the display panel, which will be described below with reference to the accompanying drawings.

Figure 1:
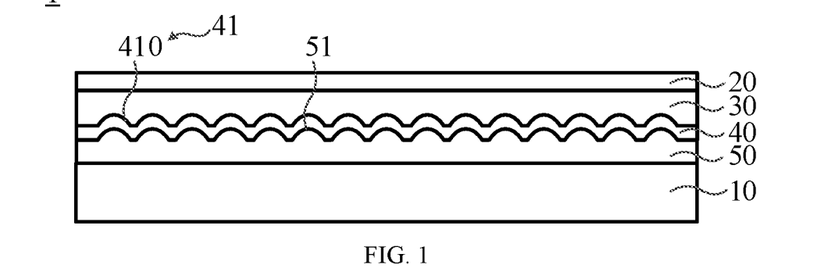
FIG. 1 is a schematic structural view of a display panel according to an embodiment of the present disclosure.

Referring to FIG. 1, it is a schematic structural view of a display panel according to an embodiment of the present disclosure. An embodiment of the present disclosure provides a display panel 1, which may be of a liquid crystal display (LCD) type. The LCD is made by providing a liquid crystal cell between two parallel glass substrates, providing a thin film transistor (TFT) on a lower glass substrate of the two parallel glass substrates, and providing a color optical filter on an upper glass substrate of the two parallel glass substrates. A rotation direction of liquid crystal molecules is controlled by a signal on the TFT and a change of voltage, thereby controlling whether or not the polarized light of each pixel is emitted, so as to achieve a display purpose.

Exemplarily, the display panel 1 may include an array substrate 10, a color film substrate 20, a liquid crystal layer 30, and a reflective layer 40. The array substrate 10 is disposed opposite to the color film substrate 20, the liquid crystal layer 30 is disposed between the array substrate 10 and the color film substrate 20, and the reflective layer 40 is disposed on a side of the array substrate 10 facing the liquid crystal layer 30. The array substrate 10 may include a plurality of driving TFTs, the liquid crystal layer 30 may include a plurality of liquid crystal molecules, and the color film substrate 20 may include a color optical filter. The driving TFTs are used to drive rotation of liquid crystal molecules. Light passes through the liquid crystal layer 30 and then passes through the color film substrate 20 to the display surface of the display panel 1. Different colors can be displayed after light passes through the color film substrate 20, so that the display panel 1 shows different display effects.

LCD display screens may be divided into transmissive, semi-transmissive semi-reflective and reflective display screens. The transmissive LCDs require backlights, and the semi-transmissive semi-reflective LCDs and the reflective LCDs may use ambient light as a light source. The reflective LCDs have advantages of light weight of bodies and low power consumption, and are increasingly used in outdoor. However, at present, semi-transmissive semi-reflective liquid crystal display panels and reflective liquid crystal display panels have low reflectivity, and a maximum yield level reached in the industry may be less than or equal to 10%. The main reason for the low reflectivity is that: a reflected light path is reflected over multiple paths, so that energy loss is serious, and finally, the amount of light emitted is only 10% of the amount of incident light.

In order to solve the problem of low reflectivity of existing liquid crystal display panels to ambient light, a reflective layer 40 is disposed in the display panel 1 according to an embodiment of the present disclosure. The reflective layer 40 may be made of a metal material having a high reflectivity. For example, a material of the reflective layer 40 may be gold (Au), silver (Ag), copper (Cu), aluminum (Al), or the like. When the metal material used, for example, Ag, is easily oxidized, indium tin oxide (ITO) with a thickness may be deposited on the top and bottom of Ag film layer for protection. Certainly, if a metal material that is difficult to be oxidized is used, the ITO layers on the top and bottom surfaces can be removed.

Exemplarily, the reflective layer 40 is disposed on a side of the array substrate 10 facing the liquid crystal layer 30. It is to be understood that with the ambient light as a light source, liquid crystal molecules of the liquid crystal layer 30 can be used as a switch. The reflective layer 40 may be disposed on the side of the array substrate 10 facing the liquid crystal layer 30, so as to control an amount of light emitted from the reflective layer 40 using the liquid crystal molecules, and to further control parameters of the display panel 1, such as grayscale or brightness.

The reflective layer 40 may include a plurality of first convex structures 41, each having a first sidewall 410 extending from the bottom to the top thereof, wherein the first sidewall 410 is capable of reflecting ambient light entering from the color film substrate 30 to the display surface of the display panel 1.

The plurality of first convex structures 41 are formed in the reflective layer 40, and the first sidewalls 410 of the first convex structures 41 may reflect ambient light to the display surface of the display panel 1. Therefore, the first convex structures 41 can be disposed to increase the diffuse reflection of ambient light and reduce the influence of total reflection on the reflectivity of the reflective layer 40, thereby improving the reflectivity of the display panel 1 to ambient light.

Here, the plurality of first convex structures 41 of the reflective layer 40 are formed using an organic layer. Exemplarily, the display panel 1 may further include an organic layer 50 disposed between the array substrate 10 and the reflective layer 40. The organic layer 50 is adjacent to the reflective layer 40. The organic layer 50 may include a plurality of second convex structures 51, and the reflective layer 40 covers the organic layer 50 in a uniform thickness, to form one of the first convex structures 41 on each of the second convex structures 51. It is to be understood that the first convex structures 41 of the reflective layer 40 are formed following the formation of the second convex structures 51 of the organic layer 50. That is, after the second convex structures 51 are formed, it is merely necessary to lay a material of the reflective layer 40 on the organic layer 50. Compared with directly forming the reflective layer 40 having the first convex structures 41, first formation of the organic layer 50 having the second convex structures 51 may improve the smoothness of the reflective layer 40, thereby improving the reflective effect of the reflective layer 40. The organic layer 50 may be a flat layer or an insulating layer of the array substrate 10, and a material for fabricating the organic layer 50 may be selected from materials having photosensitivity and levelling property, so as to facilitate fabrication of concave and convex shapes thereof by exposing to a photomask, developing, and etching. For example, the material of the organic layer 50 may be polyimide (PI). For another example, the material of the organic layer 50 may be a polymer film on the array substrate 10 (PFA).

Exemplarily, an angle between normal lines of the first sidewalls 410 and a horizontal plane may be greater than 0° and less than or equal to 10°. In a plane set, a straight line having a common intersection point with a circle is referred to as a tangent line of the circle, and the common intersection point is referred to as a tangent point. A straight line passing through the tangent point and perpendicular to the tangent line is referred to as a normal line. The normal line is a dashed line which is always perpendicular to a plane. A normal line of a point located on a curved surface is a straight line passing through this point and perpendicular to a tangent plane of this point. The first sidewalls 410 may be of a curved shape, and the normal lines of the first sidewalls 410 are dashed lines perpendicular to the tangent lines of points located on the first sidewalls 410. The first sidewalls 410 may have a plurality of normal lines, and all of the normal lines of the first sidewalls 410 may have an angle of greater than 0° and less than or equal to 10° with a horizontal plane. In other words, an angle between a normal line of any point of the first sidewalls 410 and the horizontal plane is more than 0° and less than or equal to 10°. Therefore, the arrangement of the first convex structures 41 can increase the diffuse reflection of ambient light, and reduce the influence of total reflection on the reflectivity of the reflective layer 40, thereby improving the reflectivity of the display panel 1 to ambient light.

It is to be noted that the reflective layers 40 of the semi-transmissive semi-reflective TFT-LCDs and reflective TFT-LCDs may have metal electrodes, which are formed on an interlayer film having concave and convex shapes, such as the organic layer 50, wherein the concave and convex shapes of the interlayer film are distributed continuously and are changed gently. Fine internally scattered reflective electrodes having concave and convex shapes, which also are pixel electrodes used to drive operation of liquid crystals, are designed on the array substrate 10. Metal of the reflective layer 40 is required to have a reflectivity as high as possible, in addition to low resistivity. The internally scattered reflective electrodes need to have characteristics that: the incident light is uniformly reflected within a range of angle of view; a specular reflection-like metal glossy feeling cannot be generated, and components for specular reflection are eliminated; inactive components, for example, for the total reflection, are minimized; interference of light cannot occur; the stability of liquid crystal alignment needs to be ensured.

Figure 2:
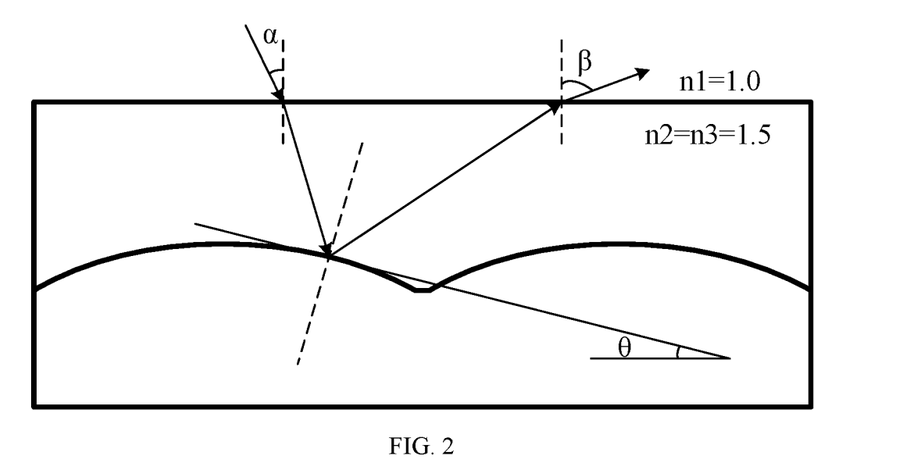
FIG. 2 is a two-dimensional reflection model view of internally scattered reflective electrodes according to an embodiment of the present disclosure.
Figure 3:
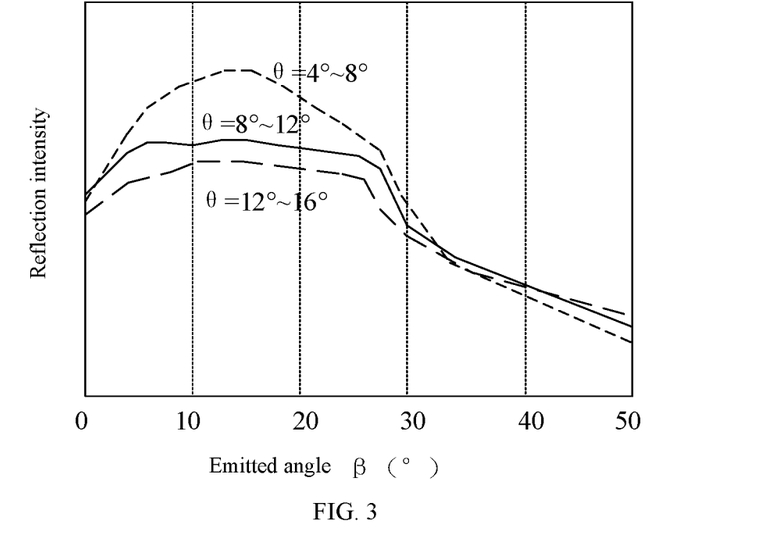
FIG. 3 is a reflection intensity profile of a simulation test of the two-dimensional reflection model shown in FIG. 2.
Figure 4:
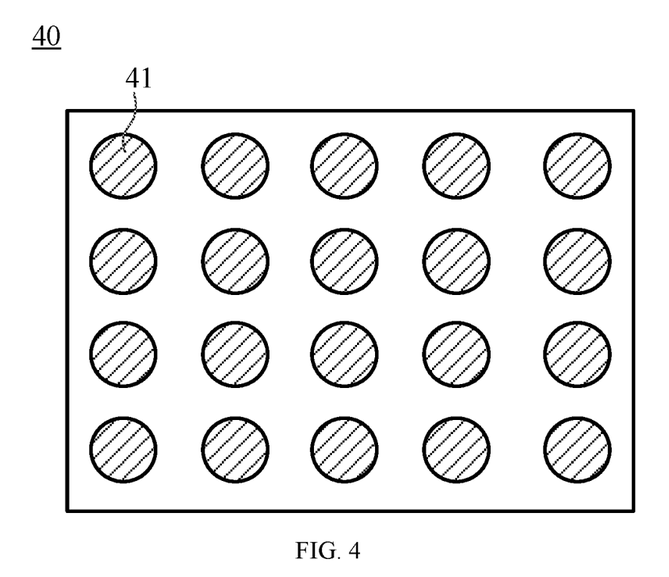
FIG. 4 is a schematic view of a first configuration of a reflective layer in the display panel shown in FIG. 1.

In order to meet the above various characteristic requirements, it is necessary to strictly control parameters, such as an inclination angle, spacing, and height, of the fine concave and convex shapes, such as the first convex structures 41. Exemplarily, referring to FIGS. 2 and 3, in combination with FIG. 1, FIG. 2 is a two-dimensional reflection model view of internally scattered reflective electrodes according to an embodiment of the present disclosure, and FIG. 3 is a reflection intensity profile of a simulation test of the two-dimensional reflection model shown in FIG. 2. The refractive index n1 of air is 1.0, and both of the refractive index n2 of glass and the refractive index n3 of liquid crystals are 1.5. An inclination angle of the internally scattered electrodes is set to θ, an incident angle of a light source is set to α, and an emitted angle of a reflected light is set to β. The concave and convex shapes of the internally scattered reflective electrodes are set to continuously change and have a sinusoidal distribution. The incidence angle α represents a light source that uniformly shine in a range of −30°-0°. The simulation test is performed according to the above conditions and settings, and the results are shown in FIG. 4. If the inclination angle θ of the internally scattered reflective electrodes is in a range of 4°-8°, and the corresponding reflected light is defined as a viewing angle range, such viewing angle range is in a range of 0°-20°, and the reflected light is uniformly reflected. For each of the concave and convex shapes, if the inclination angle thereof continuously increases, the reflection intensity decreases accordingly. This is because the total reflection component increases correspondingly with the increase of the inclination angle, and the proportion of reflected light that cannot be emitted from the display screen increases. Therefore, in an embodiment of the present disclosure, the inclination angle of the first inclined sidewalls 410 of the first convex structures 41 is limited to a range of 0°-10° to enhance the diffuse reflection of the reflective layers 40 and reduce the influence of the total reflection on the reflectivity.

Figure 5:
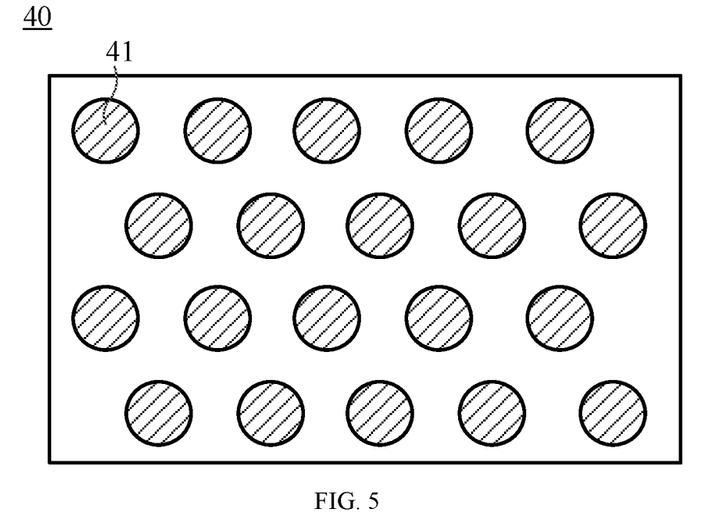
FIG. 5 is a schematic view of a second configuration of a reflective layer in the display panel shown in FIG. 1.

It is to be noted that, referring to FIGS. 4 and 5, in combination with FIGS. 1 to 3, FIG. 4 is a schematic view of a first configuration of a reflective layer in the display panel shown in FIG. 1, and FIG. 5 is a schematic view of a second configuration of a reflective layer in the display panel shown in FIG. 1. Exemplarily, an orthographic projection, on the array substrate of each of the first convex structures 41 may be circular. The plurality of first convex structures 41 may be arranged in an array, i.e., an orderly arrangement in rows and columns, so that the reflectivity of the reflective layer 40 to ambient light can be increased in all areas of the display panel 1. Certainly, the plurality of first convex structures 41 may also be arranged in M rows and N columns, and the first convex structures 41 of two adjacent rows may be arranged in a staggered manner, thereby improving the uniformity of the distribution of the first convex structures 41. Both of M and N are integers greater than 0. Certainly, the plurality of first convex structures 41 may be arranged in other manners, which will not be illustrated here in detail.

Figure 6:
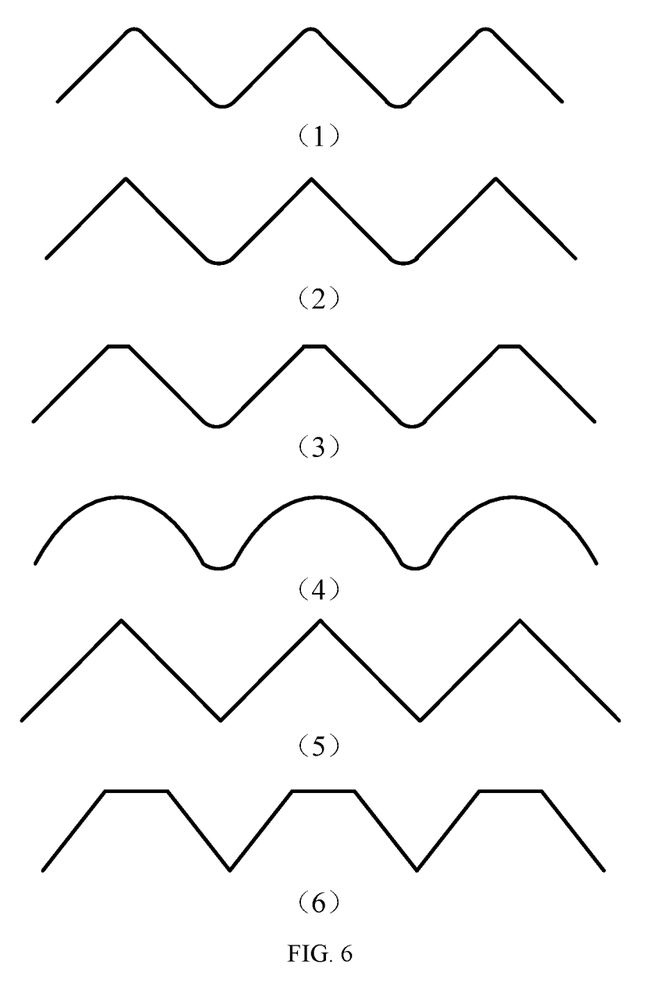
FIG. 6 is a schematic view of various cross-sectional configurations of the reflective layer in the display panel shown in FIG. 1.

Due to the difference of manufacturing process, the first convex structures 41 may have a plurality of configurations. Referring to FIG. 6, in combination with FIGS. 1 to 5, FIG. 6 is a schematic view of various cross-sectional configurations of the reflective layer in the display panel shown in FIG. 1. Certainly, only a portion of cross-sectional shapes of the first convex structures 41 are illustrated herein, and it is not to be construed as limiting the shapes of the first convex structures 41. It is to be noted that, regardless of the shape of each of the first convex structures 41, the angle between the normal line of the first sidewall 410 thereof and the horizontal plane is in a range of 0° to 10°.

The reflective layer 40 has concave and convex shapes. The reflective layer 40 may have concave and convex shapes formed by a plurality of spaced first convex structures 41. The reflective layer 40 may also have other concave and convex shapes. For example, referring to FIG. 7, in combination with FIGS. 1 to 6, FIG. 7 is a schematic view of a third configuration of the reflective layer in the display panel shown in FIG. 1. The reflective layer 40 may further comprise a plurality of convex rings 42, and each of the first convex structures 41 is provided with at least one convex ring 42 on the peripheral edge thereof. Exemplarily, a projection of each convex ring 42 on the array substrate 10 may be annular. It is to be understood that the convex rings 42 are disposed to surround the first convex structures 41, and the convex rings 42 may be disposed adjacent to the first convex structures 41. That is, an edge of an inner peripheral edge of each of the convex rings 42 overlaps or attaches an edge of an outer peripheral edge of each of the first convex structures 41. The convex rings 42 may be spaced from the first convex structures 41. That is, the edge of the inner peripheral edge of each of the convex rings 42 is spaced from the edge of the outer peripheral edge of each of the first convex structures 41. The reflective layer 40 may be a structure including only the first convex structures 41, or may be a structure including the first convex structures 41 and one, two, or a plurality of convex rings 42. The organic layer 50 is manufactured to correspond to the structure of the reflective layer 40. For example, when the reflective layer 40 includes the convex rings 42, the organic layer 50 also is required to provide with convex ring structures to serve as a base for the structure of the reflective layer 40. Exemplarily, each convex ring 42 may include a second sidewall 420. An angle between a normal line of the second sidewall 420 and a horizontal plane is greater than 0° and less than or equal to 10°. The normal line of the second sidewall 420 may be explained with reference to the normal line of the first sidewall 410, and details are not described herein. Each of the second sidewalls 420 is capable of reflecting ambient light entering from the color film substrate 20 to the reflective surface of the display panel 1. That is, the second sidewalls 420 are provided to increase the diffuse reflection of the reflective layer 40 and reduce the influence of total reflection on the reflectivity of the reflective layer 40. It is to be noted that a width of each of the convex rings 42 is generally less than the diameter of the corresponding first convex structure 41. In a case where the convex rings 42 have a height same as that of the first convex structures 41, a radian of the second sidewalls 420 of the convex rings 42 is less than that of the first sidewalls 410 of the first convex structures 41.

Figure 7:
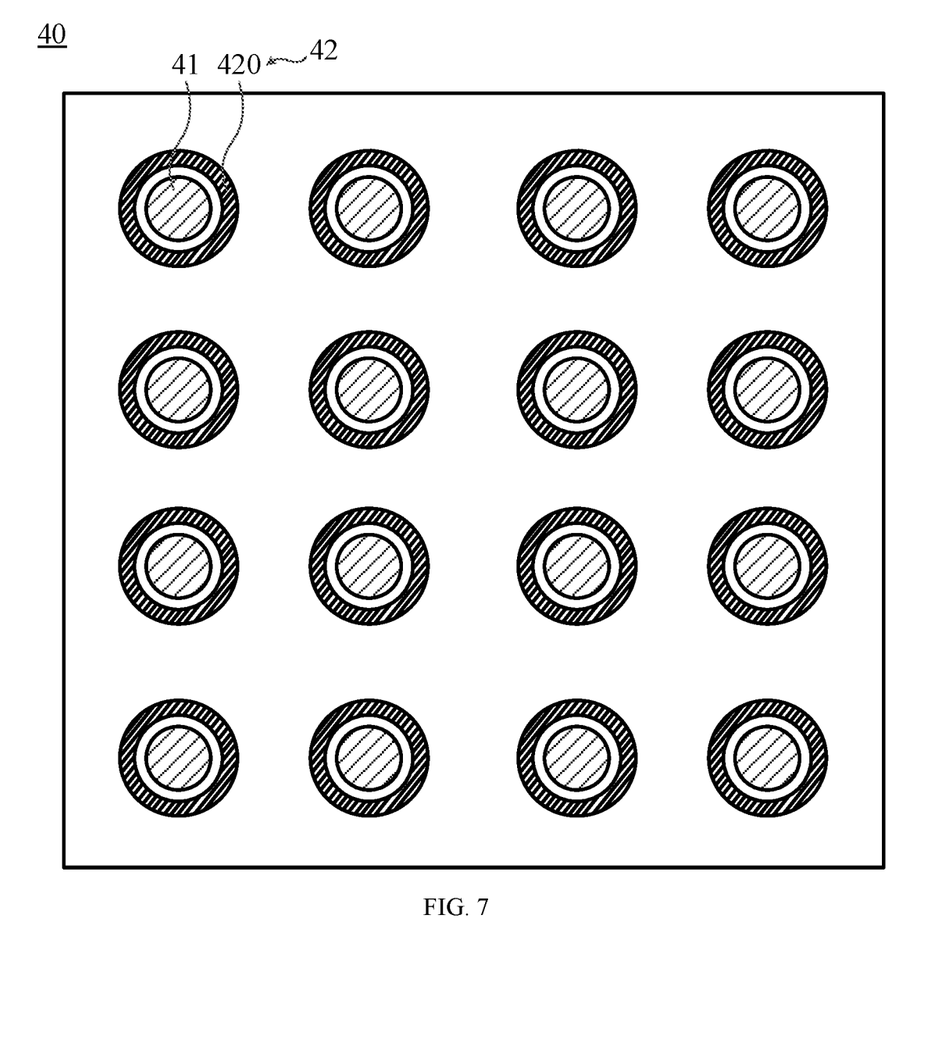
FIG. 7 is a schematic view of a third configuration of the reflective layer in the display panel shown in FIG. 1.

By providing the first convex structures 41 and the convex rings 42, the diffuse reflection of ambient light can be increased, and the influence of the total reflection on the reflectivity of the reflective layer 40 can be reduced, thereby improving the reflectivity of the display panel 1 to ambient light.

Exemplarily, the display panel 1 may further include a first transparent protective layer and a second transparent protective layer (not shown). The first transparent protective layer is disposed on the organic layer 50, the reflective layer 40 is disposed on the first transparent protective layer, and the second transparent protective layer is disposed on the reflective layer 40. It is to be noted that when an easily oxidizable material is selected as the material of the reflective layer 40, such as silver metal, it is necessary to deposit a thickness of the first transparent protective layer and the second transparent protective layer on the top and bottom of the reflective layer 40 for protection. The materials of the first and second transparent protective layer may be ITO materials.

In order to more clearly explain the structural composition of the display panel 1 according to an embodiment of the present disclosure, the following description will be made from the perspective of the preparation method of the display panel.

Figure 8:
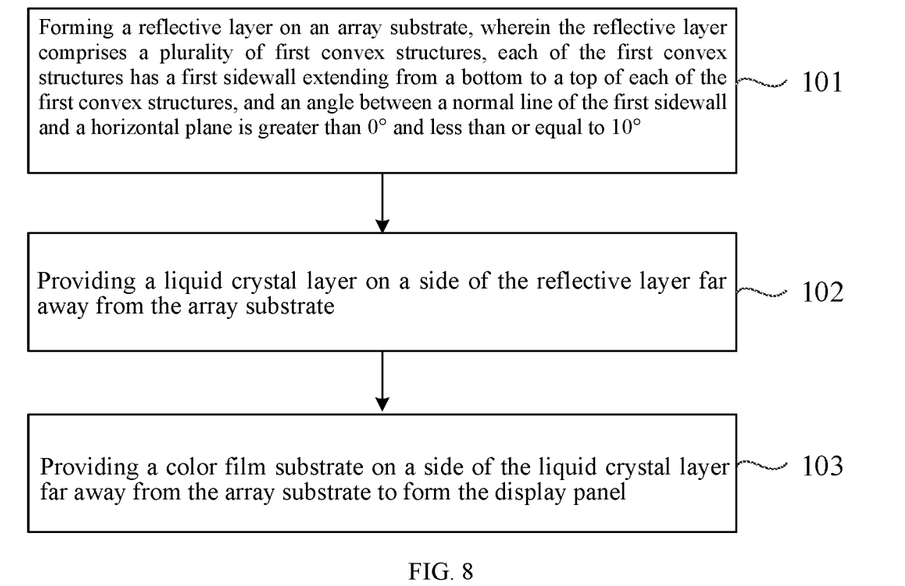
FIG. 8 is a first flow chart of a method of manufacturing a display panel according to an embodiment of the present disclosure.

Exemplarily, referring to FIG. 8, in combination with FIGS. 1-7, FIG. 8 is a first flow chart of a method of manufacturing a display panel according to an embodiment of the present disclosure. An embodiment of the present disclosure provides a method of manufacturing a display panel. The structure of the display panel 1 may be illustrated with reference to FIGS. 1 to 7 in conjunction with the above description, and details are not described herein. The preparation method of the display panel may include:

101. Forming a reflective layer on an array substrate, wherein the reflective layer comprises a plurality of first convex structures, each of the first convex structures has a first sidewall extending from a bottom to a top of each of the first convex structures, and an angle between a normal line of the first sidewall and a horizontal plane is greater than 0° and less than or equal to 10°.

Exemplarily, the reflective layer 40 is disposed on a side of the array substrate 10 facing a liquid crystal layer 30. It is to be understood that with ambient light as a light source, liquid crystal molecules of the liquid crystal layer 30 can be used as a switch. The reflective layer 40 is disposed on the side of the array substrate 10 facing the liquid crystal layer 30, so as to control an amount of light emitted from the reflective layer 40 using the liquid crystal molecules, thereby controlling parameters such as grayscale or brightness of the display panel 1.

The reflective layer 40 may include a plurality of first convex structures 41, each having a first sidewall 410 extending from the bottom to the top thereof. The first sidewall 410 is capable of reflecting ambient light entering from a color film substrate 30 to the display surface of the display panel 1.

The plurality of first convex structures 41 are formed in the reflective layer 40, and the first sidewalls 410 of the first convex structures 41 can reflect ambient light to the display surface of the display panel 1. Therefore, the setting of the first convex structures 41 can increase the diffuse reflection of ambient light and reduce the influence of total reflection on the reflectivity of the reflective layer 40, thereby improving the reflectivity of the display panel 1 to ambient light.

102. Providing a liquid crystal layer on a side of the reflective layer far away from the array substrate.

103. Providing a color film substrate on a side of the liquid crystal layer far away from the array substrate to form the display panel.

With respect to steps 102 and 103:

The display panel 1 includes an array substrate 10, a color film substrate 20 opposite to the array substrate 10, and a liquid crystal layer 30 and a reflective layer 40 disposed between the array substrate 10 and the color film substrate 20. During fabrication, the array substrate 10 is generally first fabricated, followed by the reflective layer 40 and the liquid crystal layer 30 in sequence, and finally the color film substrate 20 is disposed on a side of the liquid crystal layer 30 far away from the array substrate 10, thereby forming the display panel 1.

Figure 9:
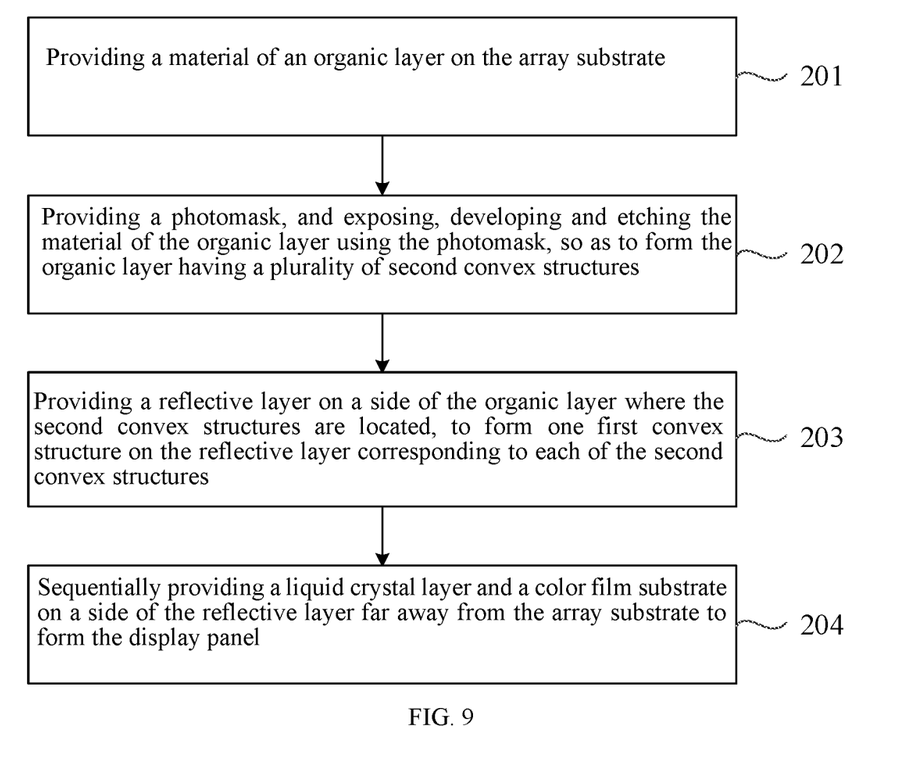
FIG. 9 is a second flow chart of a method of manufacturing a display panel according to an embodiment of the present disclosure.
Figure 10:
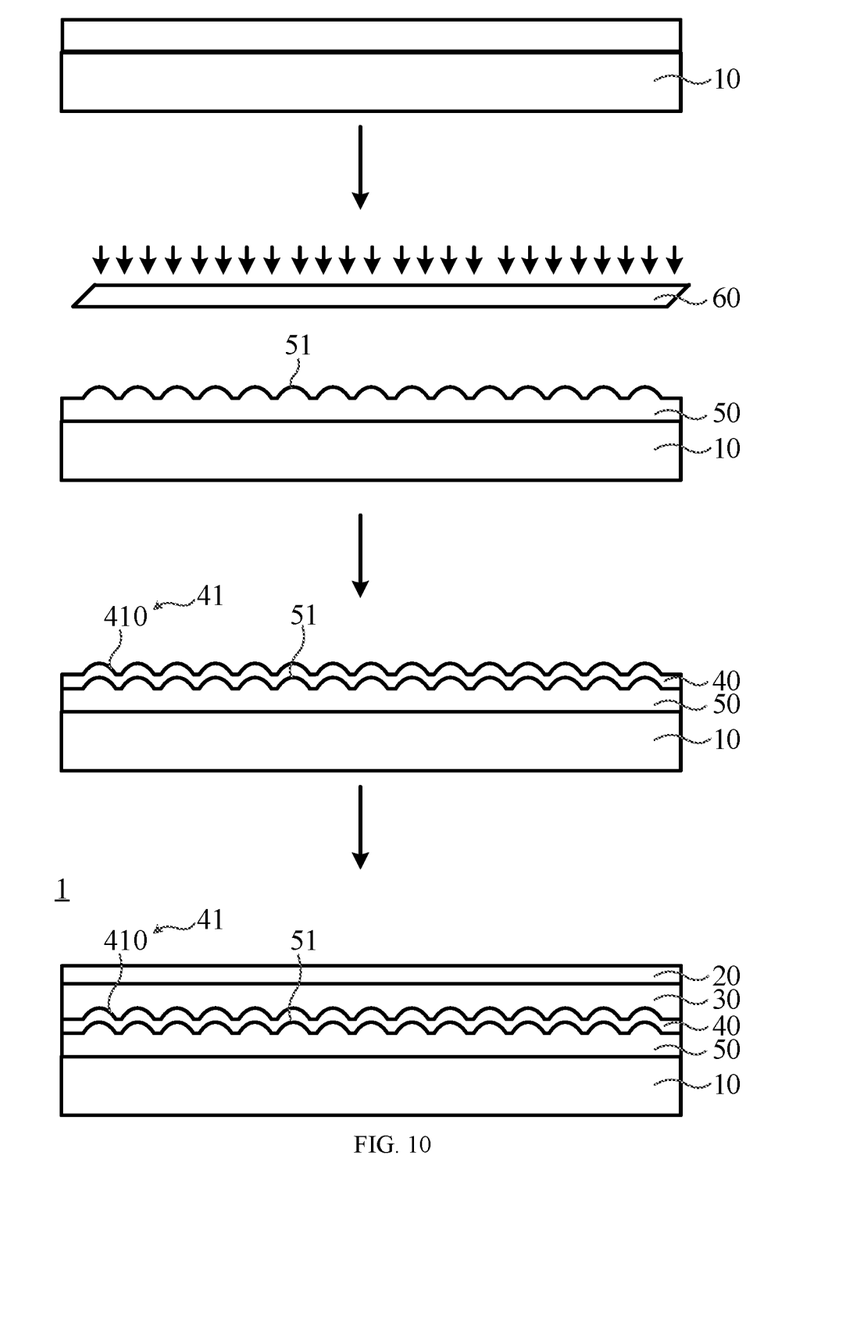
FIG. 10 is a schematic view of a process for manufacturing a display panel according to an embodiment of the present disclosure.

It is to be noted that the first convex structures 41 are formed on an organic layer convex structure as a base. Exemplarily, referring to FIGS. 9 and 10, in combination with FIGS. 1 to 8, FIG. 9 is a second flow chart of a method of manufacturing a display panel according to an embodiment of the present disclosure, and FIG. 10 is a schematic view of a process for manufacturing a display panel according to an embodiment of the present disclosure. An embodiment of the present disclosure further provides a method for manufacturing a display panel, comprising:

201. Providing a material of an organic layer on the array substrate.

The display panel 1 of an embodiment of the present disclosure may be a reflective LCD, and the incident ambient light is reflected by the reflective layer on the array substrate 10, thereby realizing display of the display panel 1. The reflective layer is disposed on a side of the array substrate 10 facing the liquid crystal layer, whereby liquid crystal molecules can be used as switches, so as to control the amount of light emitted from the reflective layer, and parameters such as display brightness or display grayscale of the display panel 1 can be controlled.

The reflective layer has first convex structures. Before fabricating the reflective layer, an organic layer having concave and convex structures can be first fabricated, and then the reflective layer is fabricated, so that the reflective layer also has the concave and convex structures. By this configuration, the first convex structures of the reflective layer are facilitated and surfaces of the first convex structures are smooth.

A material of the organic layer may be laid on the prepared array substrate 10 in a predetermined thickness, and then the concave and convex structures may be manufactured.

202. Providing a photomask, and exposing, developing and etching the material of the organic layer using the photomask, so as to form the organic layer having a plurality of second convex structures.

The second convex structures of the organic layer 50 may be formed by only a photomask 60. The material of the organic layer may be exposed, developed, and etched using the photomask 60 to form the organic layer 50 having the plurality of second convex structures 51. It is to be understood that a photosensitive material may be selected as the material of the organic layer 50, and the material of the organic layer 50 may be leveled. The material of the organic layer 50 may be in a liquid state and may be cured after the second convex structures 51 have been formed.

The pattern of the photomask 60 may be designed so that the fabrication of the second convex structures 51 can be realized by exposing, developing and etching with only a photomask 60, so the fabrication process is simple.

Figure 11:
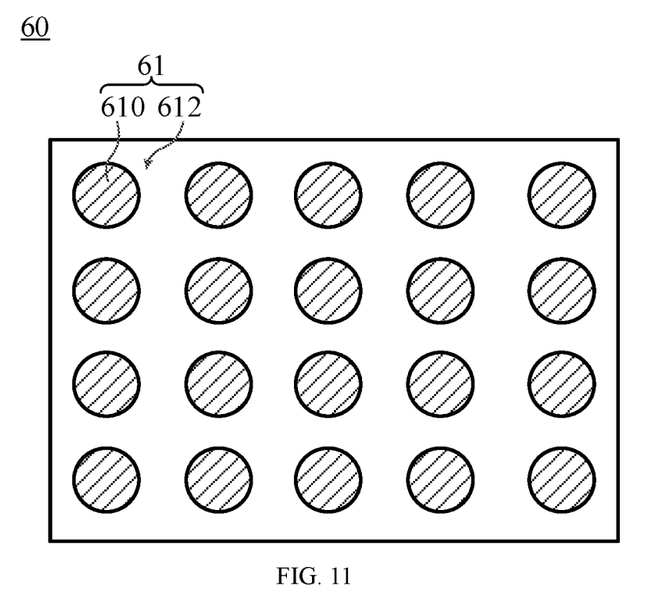
FIG. 11 is a schematic view of a first configuration of a photomask according to an embodiment of the present disclosure.
Figure 12:
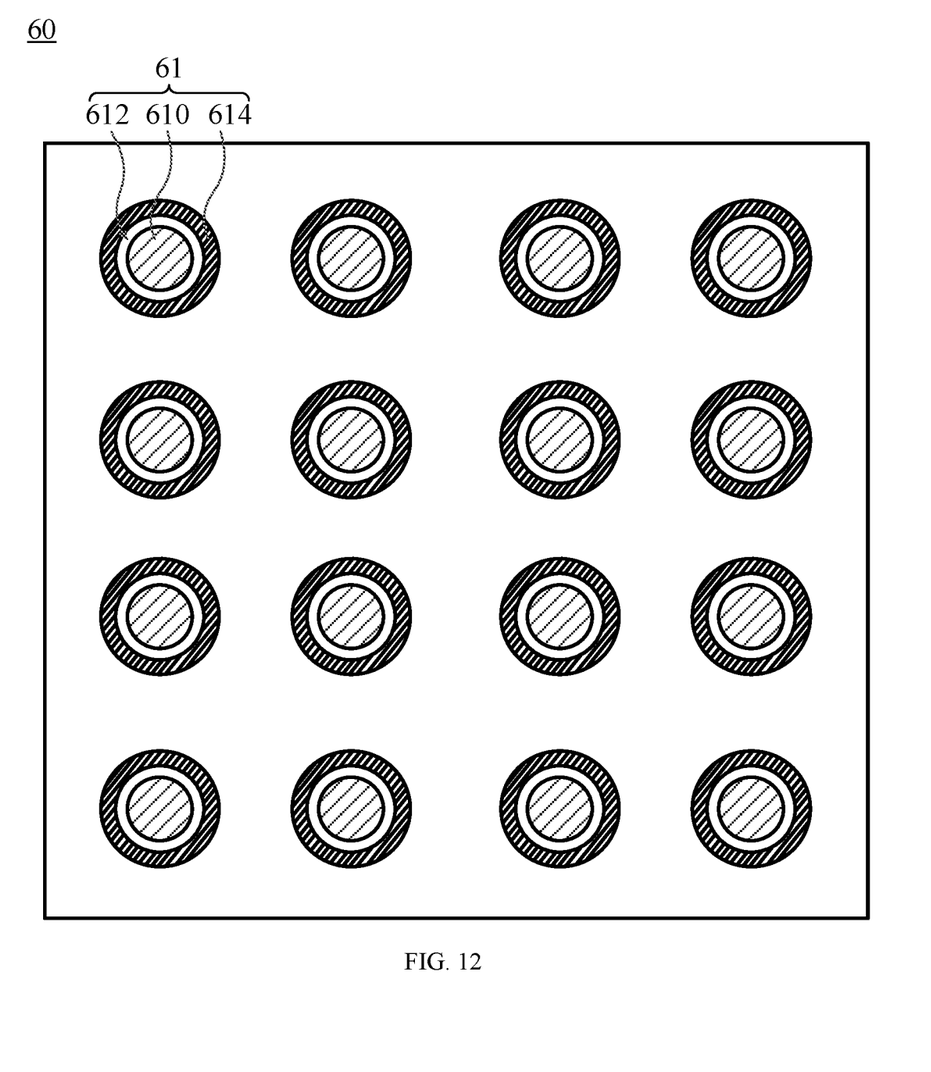
FIG. 12 is a schematic view of a second configuration of a photomask according to an embodiment of the present disclosure.

Exemplarily, referring to FIGS. 11 and 12, in combination with FIGS. 1 to 10, FIG. 11 is a schematic view of a first configuration of a photomask according to an embodiment of the present disclosure, and FIG. 12 is a schematic view of a second configuration of a photomask according to an embodiment of the present disclosure. The photomask 60 may include a plurality of developing units 61, each of the developing units may include a first light-shielding portion 610 and a light transmission region 612, and the light transmission region 612 is disposed to surround the first light-shielding portion 610. For example, each of the first light-shielding portions 610 may be a circle, a polygon such as a triangle, a quadrangle, a pentagon, or a hexagon. The plurality of first light-shielding portions 610 are spaced from each other, and the light transmission regions 612 surrounding the first light-shielding portions 610 may overlap with each other. For example, in manufacturing the photomask 60, a light-shielding material is first provided, and then the light-shielding material is patterned with a plurality of circular first light-shielding portions 610. The peripheral edge of each of the first light-shielding portions 610 is hollowed out to form a plurality of developing units 61 having light transmission regions 612. The plurality of developing units 61 constitute the photomask 60. Certainly, the structure of each of the developing units 61 is not limited to the above-described constitution. For example, each of the developing units 61 may include a first light-shielding portion 610 and at least one second light-shielding portion 614. Each of the second light-shielding portions 614 is disposed to surround one of the first light-shielding portions 610. The peripheral edge of each of the first light-shielding portions 610 may be surrounded with at least one second light-shielding portion 614. A light transmission region 612 is disposed between one first light-shielding portion 610 and a second light-shielding portion 614 close to the one first light-shielding portion 610, and a light transmission region 612 is disposed between two adjacent second light-shielding portions 614. For example, in manufacturing the photomask 60, a light-shielding material is first provided, and then the light-shielding material is patterned with a plurality of circular first light-shielding portions 610. At least one annular second light-shielding portion 614 is engraved around each of the first light-shielding portions 610. A region between one first light-shielding portion 610 and the second light-shielding portion 614 close thereto and a region between two adjacent second light-shielding portions 614 are hollowed out to form a plurality of developing units 61 having light transmission regions 612. The plurality of developing units 61 constitute the photomask 60. It is to be noted that the shape of each of the first light-shielding portions 610 is not limited to a circle, and the shape of each of the first light-shielding portions 610 may also be a triangle, a quadrangle, a pentagon, or a polygon. The first light-shielding portion 610 is described herein by using a circle as an example, while it should not be construed as limiting the shape of the first light-shielding portion 610.

It is to be understood that the structure of the organic layer 50 formed by the above-described two photomasks 60 is different, thereby preparing reflective layers of different shapes for subsequent fabrication.

The plurality of developing units 61 may be arranged in an array, or the plurality of developing units 61 may be arranged in M rows and N columns, and two adjacent developing units 61 are arranged in a staggered manner. Both of M and N are integers greater than 0. The arrangement of the developing units 61 may refer to the arrangement of the first convex structures 41 shown in FIGS. 4 and 5, and details are not described herein.

203. Providing a reflective layer on a side of the organic layer where the second convex structures are located, to form one first convex structure on the reflective layer corresponding to each of the second convex structures.

After the preparation of the second convex structures 51 of the organic layer 50 is completed, a material of the reflective layer is disposed on a side of the organic layer 50 where the second convex structures 51 are located, to form the reflective layer 40 having a plurality of first convex structures 41. Each of the first convex structures 41 has a first sidewall 410 extending from the bottom to the top thereof, and an angle between a normal line of the first sidewall 410 and a horizontal plane is in a range of 0° to 10°, including 10°. The first sidewall 410 is capable of reflecting ambient light entering to the display surface of the display panel. Certainly, when the reflective layer 40 includes a convex ring 42, the second sidewall 420 of the convex ring 42 may also reflect ambient light to the display surface of the display panel.

204. Sequentially providing a liquid crystal layer and a color film substrate on a side of the reflective layer far away from the array substrate to form the display panel.

After the preparation of the reflective layer 40 is completed, the liquid crystal layer 30 and the color film substrate 20 are sequentially laid on a side of the reflective layer 40 where the first convex structures 41 are located, thereby completing the preparation of the display panel 1.

In the display panel 1 and the method for manufacturing the display panel provided in the embodiments of the present disclosure, a plurality of first convex structures 41 are formed in the reflective layer 40, and the first sidewalls 410 of the first convex structures 41 can reflect ambient light to the display surface of the display panel 1. The first convex structures 41 can be arranged to increase the diffuse reflection of ambient light and reduce the influence of total reflection on the reflectivity of the reflective layer 40, thereby improving the reflectivity of the display panel 1 to ambient light.

In the above-mentioned embodiments, the description of each of the embodiments has its own focus. For parts that are not described in detail in a certain embodiment, reference may be made to the relevant descriptions of other embodiments.

In the description of the present disclosure, the terms "first" and "second" are used for descriptive purposes only and are not to be construed as indicating or implying relative importance or implying the number of indicated technical features. Thus, features defined by "first", "second" may explicitly or implicitly include one or more features.

A display panel and a method for preparing the display panel according to embodiments of the present disclosure has been described in detail. Specific examples are used herein to illustrate the principles and implements of the present disclosure. The description of the above embodiments is merely provided to help understand the method of the present disclosure and the core idea thereof. Meanwhile, variations will occur to those skilled in the art in both the specific embodiments and application scope in accordance with the teachings of the present disclosure. In summary, the present description should not be construed as limiting the disclosure.

What is claimed is:

1. A display panel, comprising:
   an array substrate;
   a color film substrate disposed opposite to the array substrate;
   a liquid crystal layer disposed between the array substrate and the color film substrate;
   a reflective layer disposed on a side of the array substrate facing the liquid crystal layer, wherein the reflective layer comprises a plurality of first convex structures, each of the first convex structures has a first sidewall extending from a bottom to a top of each of the first convex structures, and an angle between a normal line of the first sidewall and a horizontal plane is greater than 0° and less than or equal to 10°; and
   an organic layer disposed between the array substrate and the reflective layer, wherein the organic layer comprises a plurality of second convex structures, and the reflective layer covers the organic layer in a uniform thickness to form one of the first convex structures on each of the second convex structures,
   wherein the reflective layer further comprises a plurality of convex rings, and at least one of the convex rings is disposed on a peripheral edge of each of the first convex structures.

2. The display panel according to claim 1, wherein each of the convex rings comprises a second sidewall, and an angle between a normal line of the second sidewall and a horizontal plane is greater than 0° and less than or equal to 10°.

3. The display panel according to claim 2, wherein an orthographic projection of each of the first convex structures on the array substrate is circular, and an orthographic projection of each of the convex rings on the array substrate is annular.

4. The display panel according to claim 1, wherein the display panel comprises a first transparent protective layer and a second transparent protective layer, and the first transparent protective layer is disposed on the organic layer, the reflective layer is disposed on the first transparent protective layer, and the second transparent protective layer is disposed on the reflective layer.

* * * * *